US009661491B1

(12) United States Patent
Abramson et al.

(10) Patent No.: US 9,661,491 B1
(45) Date of Patent: May 23, 2017

(54) COMMUNICATING INFORMATION ABOUT AN UPDATE OF AN APPLICATION

(71) Applicant: Google Inc., Mountain View, CA (US)

(72) Inventors: Andrew Abramson, Sunnyvale, CA (US); Benjamin David Poiesz, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/936,762

(22) Filed: Nov. 10, 2015

(51) Int. Cl.
H04M 3/00 (2006.01)
H04W 8/22 (2009.01)
H04M 1/725 (2006.01)

(52) U.S. Cl.
CPC ......... *H04W 8/22* (2013.01); *H04M 1/72563* (2013.01)

(58) Field of Classification Search
CPC ........ H04W 8/22; H04M 1/72563; G06F 8/65
USPC ........ 455/418, 419, 420; 717/120, 170, 173, 717/178
See application file for complete search history.

(56) References Cited

U.S. PATENT DOCUMENTS

| 6,763,403 | B2 | 7/2004 | Cheng et al. | |
| 6,829,475 | B1* | 12/2004 | Lee | G01C 21/26 455/345 |
| 8,914,791 | B1* | 12/2014 | Salzano | G06F 8/65 717/120 |
| 2002/0069213 | A1 | 6/2002 | Moslander et al. | |
| 2004/0098314 | A1 | 5/2004 | Cool | |
| 2007/0233782 | A1* | 10/2007 | Tali | G06F 8/61 709/203 |
| 2011/0246904 | A1* | 10/2011 | Pinto | G06F 9/4445 715/740 |
| 2011/0252114 | A1* | 10/2011 | Okuyama | G06F 8/60 709/217 |
| 2012/0303573 | A1 | 11/2012 | Pan et al. | |
| 2012/0317154 | A1* | 12/2012 | Fish | G06Q 30/00 707/807 |
| 2013/0232229 | A1* | 9/2013 | Firman | G06F 8/61 709/219 |

(Continued)

OTHER PUBLICATIONS

"Are You Always Updating Your Apps?", LockerGnome; Jan. 22, 2013; http://www.lockergnome.com/mobile/2013/01/22/areyoualwaysupdatingyourapps/ as downloaded on Aug. 5, 2015.

(Continued)

*Primary Examiner* — Khai M Nguyen
(74) *Attorney, Agent, or Firm* — Morris & Kamlay LLP

(57) ABSTRACT

In a computer-implemented method for communicating information about an update of an application, a digital distribution platform can receive, at a first time, the update of the application. The digital distribution platform can receive, at a second time, a signal from a user device. The signal can include a request to receive a transmission of a user interface customized for a user account. The digital distribution platform can automatically determine, in response to receipt of the request to receive the transmission of the user interface customized for the user account, that the application was downloaded, at a third time, to the user device. The digital distribution platform can automatically generate, in response to the second time being later than the first time, the user interface. The user interface can include the information about the update.

22 Claims, 8 Drawing Sheets

(56) References Cited

U.S. PATENT DOCUMENTS

| | | |
|---|---|---|
| 2014/0195297 A1 | 7/2014 | Abuelsaad et al. |
| 2015/0081660 A1* | 3/2015 | Margulis ................ G06Q 30/02 707/706 |
| 2015/0143409 A1 | 5/2015 | Maughan |
| 2015/0261518 A1* | 9/2015 | Viswanathan ............ G06F 8/71 717/168 |

OTHER PUBLICATIONS

International Search Report and Written Opinion dated Jan. 19, 2017 as received in Application No. PCT/US2016/061112.

* cited by examiner

COMMUNICATING INFORMATION ABOUT AN UPDATE OF AN APPLICATION

BACKGROUND

Application software products (i.e., applications) have been developed to perform a variety of functions related to, for example, word processing, spreadsheets, slide show presentations, database management, electronic mail, Internet access, business productivity, educational assistance, health and fitness management, providing digital content (such as, for example, text, pictures, audio, video, and electronic games), navigation, text messaging, access to social media networks, etc. Often, entities, such as developers, that prepare, maintain, or own such applications want or need to provide updates to them. Such updates can be made for a variety of reasons including, for example, to fix software bugs, to add features, to address issues related to security, and to ensure compatibility with changes to operating systems used to run the corresponding applications.

Additionally, the advancement of electronic communication network bandwidth capabilities in the last decade has enabled the delivery of applications to shift from being primarily performed via physical data storage devices (such as, for example, floppy disks, compact discs, digital versatile discs, and Universal Serial Bus flash drives) to being performed via online distribution in which developers can upload applications to a digital distribution platform and users can download applications from the digital distribution platform.

BRIEF SUMMARY

According to an embodiment of the disclosed subject matter, in a computer-implemented method for communicating information about an update of an application, a digital distribution platform can receive, at a first time, the update of the application. The digital distribution platform can receive, at a second time, a signal from a user device. The signal can include a request to receive a transmission of a user interface customized for a user account. The digital distribution platform can automatically determine, in response to receipt of the request to receive the transmission of the user interface customized for the user account, that the application was downloaded, at a third time, to the user device. The digital distribution platform can automatically generate, in response to the second time being later than the first time, the user interface. The user interface can include the information about the update.

According to an embodiment of the disclosed subject matter, in a non-transitory computer-readable medium storing computer code for controlling a processor to cause the processor to communicate information about an update of an application, the computer code can include instructions to cause the processor to receive, at a first time, the update of the application. The computer code can include instructions to cause the processor to receive, at a second time, a signal from a user device. The signal can include a request to receive a transmission of a user interface customized for a user account. The computer code can include instructions to cause the processor to determine, in response to receipt of the request to receive the transmission of the user interface customized for the user account, that the application was downloaded, at a third time, to the user device. The computer code can include instructions to cause the processor to generate, in response to the second time being later than the first time, the user interface. The user interface can include the information about the update.

According to an embodiment of the disclosed subject matter, a system for communicating information about an update of an application can include communications circuitry and a processor. The communications circuitry can be configured to receive the update of the application. The communications circuitry can be configured to receive a signal from a user device. The signal can include a request to receive a transmission of a user interface customized for a user account. The processor can be configured to determine a time at which the system received the update. The processor can be configured to determine a time at which the system received the request. The processor can be configured to determine, in response to receipt of the request to receive the transmission of the user interface customized for the user account, a time at which the application was downloaded to the user device. The processor can be configured to generate, in response to the time at which the system received the update being later than the time at which the application was downloaded to the user device and in response to the time at which the system received the request being later than the time at which the system received the update, the user interface. The user interface can include the information about the update.

According to an embodiment of the disclosed subject matter, a system for communicating information about an update of an application can include means for receiving the update of the application. The system can include means for receiving a signal from a user device. The signal can include a request to receive a transmission of a user interface customized for a user account. The system can include means for determining a time at which the update was received. The system can include means for determining a time at which the request was received. The system can include means for determining, in response to receipt of the request to receive the transmission of the user interface customized for the user account, a time at which the application was downloaded to the user device. The system can include means for generating, in response to the time at which the system received the update being later than the time at which the application was downloaded to the user device and in response to the time at which the system received the request being later than the time at which the system received the update, the user interface. The user interface can include the information about the update.

Additional features, advantages, and embodiments of the disclosed subject matter are set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
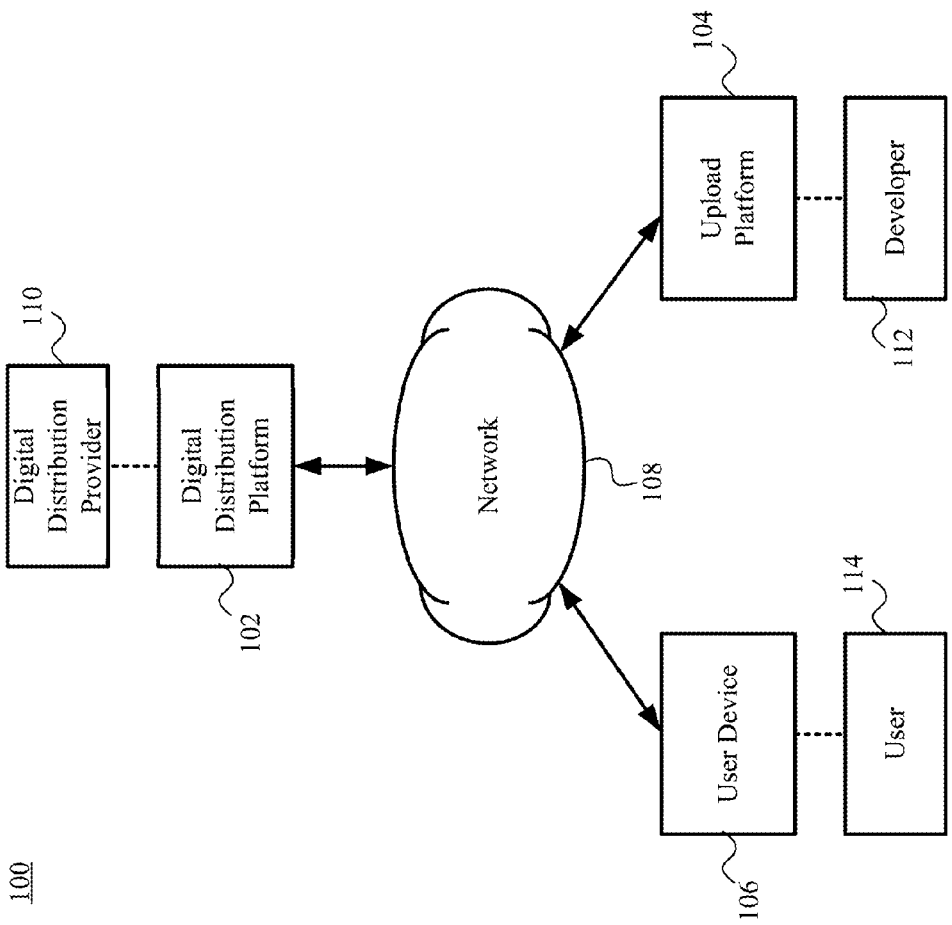
FIG. 1 is a diagram illustrating an example of an environment in which the information about an update of an application can be communicated according to the disclosed subject matter.

A wide assortment of information (such as, for example, software, text, pictures, audio, video, and interactive games) can be provided to users as digital content. Digital content intended to be presented to users can be included in application software products (i.e., applications or "apps"). In addition to presenting digital content, applications have also been developed to perform a variety of functions related to, for example, word processing, spreadsheets, slide show presentations, database management, electronic mail, Internet access, business productivity, educational assistance, health and fitness management, navigation, text messaging, access to social media networks, etc. Often, entities, such as developers, that prepare, maintain, or own such applications may want or need to provide updates to them. Such updates can be made for a variety of reasons including, for example, to fix software bugs, to add features, to address issues related to security, and to ensure compatibility with changes to operating systems used to run the corresponding applications.

Additionally, the advancement of electronic communication network bandwidth capabilities in the last decade has fostered the development of mobile computing devices such as, for example, tablet computers, smartphones, and personal digital assistants. Through electronic communication networks, mobile computing devices can obtain information about their locations. The combination of the portability of mobile computing devices and the ability of these devices to obtain information about their locations has encouraged the introduction of vast numbers of applications to expand the functionality of these devices. Additional numbers of applications have also been produced for traditional, stationary computing devices such as, for example, desktop computers.

Moreover, the growth in electronic communication network bandwidth has also enabled the delivery of applications to shift from being performed primarily via physical data storage devices (such as, for example, floppy disks, compact discs, digital versatile discs, and Universal Serial Bus flash drives) to being performed via online distribution in which developers can upload applications to a digital distribution platform and users can download applications from the digital distribution platform. Online distribution has also allowed applications to be updated at an increasingly frequent rate. This situation gives rise to the specific problem, rooted in the vast numbers of applications and the increasingly frequent rate at which they are updated, of communicating to users information about updates made to previously downloaded applications.

Conventionally, information about updates made to previously downloaded applications is automatically communicated via a push approach. In a push approach, information about the updates is automatically communicated, when a threshold is reached, to user devices to which respective applications were previously downloaded. The threshold can be a count of updates to be made to several applications and/or a duration of time since information about updates was previously communicated. Conventionally, such information merely includes notices that the applications have been updated and invitations for users of the user devices to download the updates. Such an approach fails to provide users with specific information about the updates such as the content of the update, what features or portions of an application may be available in conjunction with installation of the update, which are unavailable or function differently without installation of the update, and the like. Additionally, because the information about the updates is automatically communicated to the user devices, the push approach may result in users declining to download updates out of a belief that the updates are irrelevant or not of interest to the users.

In contrast, according to embodiments disclosed herein, information about updates can be communicated to the user in response to a user account, provided by a digital distribution provider, being accessed by a user. In this manner, the information about the update can be presented to the user in an environment in which the user may be more likely to be receptive to thinking about the information about the update. In such an environment, the user may be more likely to act on the information about the update, for example, by downloading the update. Moreover, according to embodiments disclosed herein, the user can be provided with specific information about the update, such as that the update includes additional content, features, options, or the like, or specific descriptions of the additional or different content, features, options, or the like (e.g., "50% New Content!", "Free currency now included!", "Check out the free items inside!", "See the discounts on back to school items!", etc.). Having such specific information, the user may be more likely to act on the information about the update, for example, by downloading the update.

FIG. 1 is a diagram illustrating an example of an environment 100 in which the information about an update of an application can be communicated according to the disclosed subject matter. The environment 100 can include several elements such as, for example, a digital distribution platform 102, an upload platform 104, and a user device 106. In an embodiment, an element of the environment 100 can be communicatively connected to one or more other elements via a network 108. The digital distribution platform 102, such as an application marketplace, online store, or other distribution system, can be used, for example, by a digital distribution provider 110. The upload platform 104 can be used, for example, by a developer 112. The user device 106 can be used, for example, by a user 114.

For example, the developer 112, using the upload platform 104 and via the network 108, can upload an application to the digital distribution platform 102. For example, the user 114, using the user device 106 and via the network 108, can establish a user account provided by the digital distribution provider 110. In response to the user 114 being logged into the user account via the user device 106 and the network 108, the digital distribution platform 102 may then provide a user interface, such as a web page, for the user account. For example, the user interface can be provided to the user device 106 via the network 108. The user interface can include one or more graphical control elements that can be selected or otherwise activated by the user, such as to execute or to access one or more applications. A graphical representation, such as an icon, can be associated with each of the graphical control elements. Each graphical representation can identify a particular application. For example, the user 114, using the user interface, can download an application from the digital distribution platform 102, via the network 108, to the user device 106. The developer 112, using the upload platform 104 and via the network 108, can also upload an update to an application to the digital distribution platform 102, which then can be used by the user 114 to update the application as disclosed in further detail herein.

In general, each of the platforms 102 and 104 can be a computer-implemented platform configured to automatically perform some or all of the functions disclosed herein. The digital distribution platform 102 can be, for example, a combination of hardware architecture, operating system, runtime libraries, and/or computer software or code object to support digital distribution applications. In an embodiment, the digital distribution platform 102 can be configured specifically to perform digital distribution operations. The upload platform 104 can be, for example, a combination of hardware architecture, operating system, runtime libraries, and/or computer software or code object to support upload applications. In an embodiment, the upload platform 104 can be configured specifically to perform upload operations.

The user device 106 can be, for example, any suitable electronic user device, such as a smartphone, a cellular phone, a personal digital assistant (PDA), a wireless communication device, a handheld device, a desktop computer, a laptop computer, a netbook, a tablet computer, a web portal, a digital video recorder, a video game console, an e-book reader, etc.

The network 108 can be, for example, a telecommunications network configured to allow computers to exchange data. Connections between elements of the environment 100 via the network 108 can be established using cable media, wireless media, or both. Data traffic on the network 108 can be organized according to a variety of communications protocols including, but not limited to, the Internet Protocol Suite (Transmission Control Protocol/Internet Protocol (TCP/IP)), the Institute of Electrical and Electronics Engineers (IEEE) 802 protocol suite, the synchronous optical networking (SONET) protocol, the Asynchronous Transfer Mode (ATM) switching technique, or any combination thereof. In an embodiment, the network 108 can include the Internet.

Figure 2:
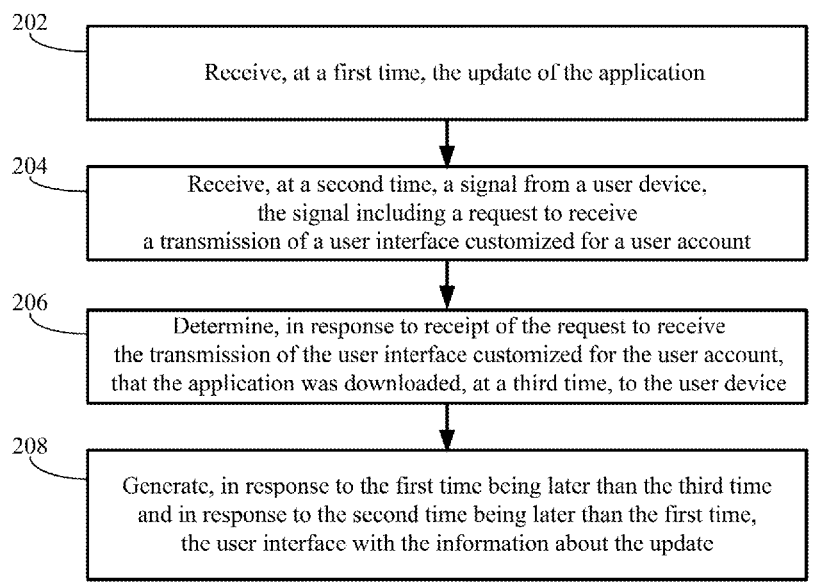
FIG. 2 is a flow diagram illustrating an example of a method for communicating information about an update of an application according to an embodiment of the disclosed subject matter.

FIG. 2 is a flow diagram illustrating an example of a method 200 for communicating information about an update of an application according to an embodiment of the disclosed subject matter. In the method 200, at an operation 202, a digital distribution platform can receive, at a first time, the update of the application. For example, the digital distribution platform can be the digital distribution platform 102 illustrated in FIG. 1. In an aspect, the digital distribution platform can include or can be operatively coupled to a first database. The first database can be configured to store the application, information about the application, etc. The first database can be configured to record activities of a developer with respect to the application. Such activities can include, for example, dates and times at which the application is uploaded, dates and times at which updates to the application are uploaded, information about the updates, etc. In an aspect, a processor of the digital distribution platform can be configured to retrieve the first time from the first database.

At an operation 204, the digital distribution platform can receive, at a second time, a signal from a user device. The signal can include a request to receive a transmission of a user interface customized for a user account. The user device and the user account can be associated with a user. The user account can be with a digital distribution provider. The digital distribution provider can be configured to provide, for each user account, a customized user interface. The customized user interface can be configured to present information in a manner preferred by the associated user. For example, the user device can be the user device 106, the user can be the user 114, and the digital distribution provider can be the digital distribution provider 110 as illustrated in FIG. 1. In an aspect, communications circuitry of the digital distribution platform can be configured to receive the signal from the user device.

At an operation 206, the digital distribution platform can automatically determine, in response to receipt of the request to receive the transmission of the user interface customized for the user account, that the application was downloaded, at a third time, to the user device. In an aspect, the digital distribution platform can include or can be operatively coupled to a second database. The second database can be configured to store information about a user account provided by the digital distribution provider such as an application marketplace, online store, or other distribution system. The second database can be configured to record activities of the user with respect to the user account. Such activities can include, for example, dates and times at which the user logs into the user account, dates and times at which the user logs out of the user account, identifications of applications downloaded, dates and times at which applications are downloaded, dates and times at which graphical control elements are selected or otherwise activated on a user interface for the user account, etc. In an aspect, a processor of the digital distribution platform can be configured to retrieve the third time from the second database.

At an operation 208, the digital distribution platform can automatically generate, in response to the first time being later than the third time and in response to the second time being later than the first time, the user interface. The user interface can include the information about the update. For example, if the digital distribution platform received the update of the application on Sep. 15, 2015 (the first time), received the request to receive the transmission of the user interface customized for the user account on Sep. 30, 2015 (the second time), determined that the application was downloaded to the user device on Jul. 1, 2015 (the third time), the digital distribution platform can automatically generate the user interface with the information about the update.

In an implementation, the information about the update can include a description of a change in content of the application included in the update. In an aspect, the change in content can be a new user feature of the application, a new game component in the application, a new promotion available, within the application, to a user, a change determined to be of interest to the user, the like, or any combination thereof. For example, the new user feature can be background information added to a digital media content application, new graphical control elements that allow the user to perform additional operations, new security features, etc. For instance, the new game component can include additional levels, new characters, changed items, etc. For illustration, the new promotion can include coupons, digital currency, virtual currency, award points, etc. For example, the change determined to be of interest to the user can be a particular change made to the application based upon information obtained from a profile of the user.

In an implementation, the information about the update can be presented as a change in an appearance of the user interface. The appearance of the user interface can be customized for the user account. For example, the appearance of the user interface can include an arrangement of one or more graphical representations such that each graphical representation is associated with a corresponding application. In an aspect, the change in the appearance can be a change in an appearance of a graphical representation for the application (e.g., a change in appearance of an icon for the application, a star placed next to the icon, text placed next to the icon in which the text states "50% New Content!", "Free currency now included!", "Check out the free items inside!", "See the discounts on back to school items!", etc.), an addition of text that includes at least some of the information about the update (e.g., addition of text in a display window of the user interface in which the text states "Application A now has new content!"), a change in a position of the graphical representation for the application in the arrangement (e.g., changing the position of the icon for the application to a more prominent position in the arrangement), the like, or any combination thereof.

In an aspect, an ordering of graphic representations in the arrangement can be based on an expected response of a user associated with the user account to the ordering. In an embodiment, a processor of the digital distribution platform can be configured to retrieve, from the second database, a user history with respect to one or more applications. The digital distribution platform can be configured to retrieve information about how the arrangement of the graphical representations for those one or more application were ordered on the user interface for the user account. Using this information, the digital distribution platform can be configured to determine if the user is more likely to respond to a graphical representation presented at a center of the user interface and less likely to respond to graphical representations presented progressively further away from the center of the user interface, or if the user is more likely to respond to a graphical representation presented near a top, left corner of the user interface and less likely to respond to graphical representations presented progressively further away from the top, left corner of the user interface, etc.

Advantageously, because the information about the update can be communicated to the user in response to a request from the user to receive the transmission of the user interface customized for the user account, the information about the update can be presented to the user in an environment in which the user may be more likely to be receptive to thinking about the information about the update. In such an environment, the user may be more likely to act on the information about the update, for example, by downloading the update.

Advantageously, because the user can be provided with specific information about the update (e.g., "50% New Content!", "Free currency now included!", "Check out the free items inside!", "See the discounts on back to school items!", etc.), the user may be more likely to act on the information about the update, for example, by downloading the update.

Advantageously, having the information about the update communicated according to the method 200, rather than automatically communicated according to a push approach, can reduce an amount of time that a processor of the digital distribution platform spends processing such automatic push approach communications, which can free the processor to perform other operations. Additionally or alternatively, reducing the operation of the circuits of the digital distribution platform to process such automatic push approach communications can prolong the life of such circuits.

Advantageously, having the information about the update communicated according to the method 200, rather than automatically communicated according to a push approach, can reduce an amount of time that a processor of the user device spends processing such automatic push approach communications, which can free the processor to perform other operations. Additionally or alternatively, reducing the operation of the circuits of the user device to process such automatic push approach communications can prolong the life of such circuits.

Additionally or alternatively, if the user device receives power from a portable energy source, such as a battery or a fuel cell, then reducing the operation of the circuits of the user device to process such automatic push approach communications can prolong a duration of time before the portable energy source would need to be replenished.

Advantageously, having the information about the update communicated according to the method 200, rather than automatically communicated according to a push approach, can free the bandwidth, which would otherwise be consumed to convey such automatic push approach communications, to convey other information.

Figure 3:
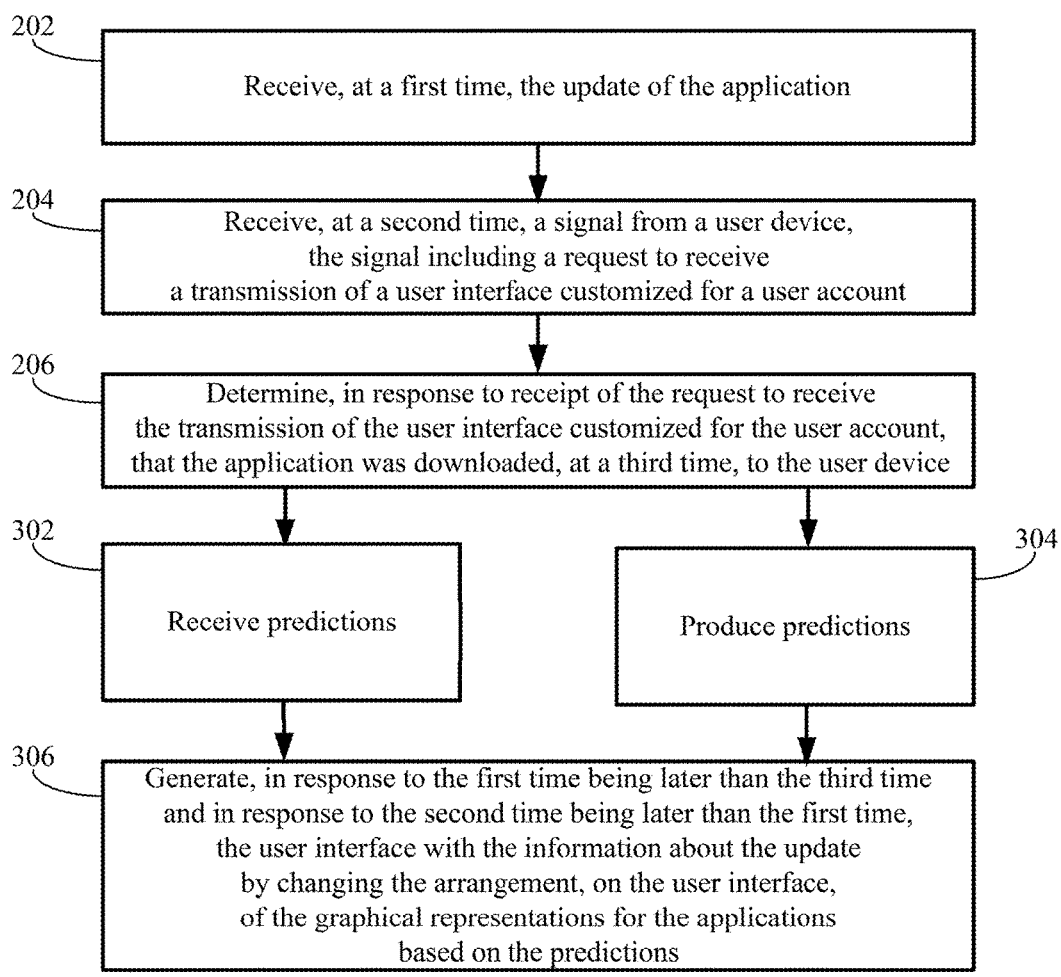
FIG. 3 is a flow diagram illustrating an example of a method for communicating information about an update of an application by changing an arrangement, on a user interface customized for a user account, of graphical representations for applications.

FIG. 3 is a flow diagram illustrating an example of a method 300 for communicating information about an update of an application by changing an arrangement, on a user interface customized for a user account, of graphical representations for applications. In the method 300, at the operation 202, the digital distribution platform can receive, at the first time, the update of the application. At the operation 204, the digital distribution platform can receive, at the second time, the signal from the user device. The signal can include the request to receive the transmission of the user interface customized for the user account. At the operation 206, the digital distribution platform can automatically determine, in response to receipt of the request to receive the transmission of the user interface customized for the user account, that the application was downloaded, at the third time, to the user device.

As described above, the information about the update can be presented as a change in an appearance of the user interface. The appearance of the user interface can be customized for the user account. For example, the appearance of the user interface can include an arrangement of one or more graphical representations such that each graphical representation is associated with a corresponding application. In an aspect, the change in the appearance can be a change in an appearance of a graphical representation for the application, an addition of text that includes at least some of the information about the update, a change in a position of the graphical representation for the application in the arrangement, the like, or any combination thereof.

In an implementation, the change in the appearance can be based on a first prediction. The first prediction can be a prediction of a response of a user associated with the user account to the information about the update. In an embodiment, a processor of the digital distribution platform can be configured to retrieve, from the second database, a user history with respect to one or more applications. The digital distribution platform can be configured to determine, from the user history, activities performed by the user in response to information about one or more previous updates to the one or more applications. The activities performed by the user in response to the information about a previous update can include activities such as selecting or otherwise activating a graphical control element in response to the information about the previous update to find out information about the respective update and/or the corresponding application, to download the respective update and/or the corresponding application, to make a purchase, etc. Based on an analysis of the user history of the activities performed by the user in response to the information about the previous update, the digital distribution platform can produce the first prediction. Based on the first prediction, the change in the appearance of the user interface can include a change in the information about the update and/or a change in a classification of the user with respect to being targeted to receive the information about the update.

Additionally or alternatively, the change in the appearance can be based on a second prediction. The second prediction can be a prediction of a preference of the user for the application, a prediction of an expected value for a developer of the application, a prediction of an expected value for a digital distribution provider, associated with the digital distribution platform, of the application, the like, or any combination thereof.

In an embodiment, a processor of the digital distribution platform can be configured to retrieve, from the second database, a user history with respect to one or more other applications. The digital distribution platform can be configured to determine, from the user history, preferences of the user for one or more other applications. Based on the preferences of the user for the one or more other applications, the digital distribution platform can produce a prediction of the preference of the user for the application.

Additionally or alternatively, the developer and the digital distribution provider can have an agreement in which the digital distribution provider is compensated in response to the user selecting or otherwise activating a graphical control element of an application of the developer. The expected value for the developer can be a product of a value to the developer of an application in having a user select or otherwise activate a graphical control element of the application multiplied by a probability that the user will select or otherwise activate the graphical control element of the application. The user may select or otherwise activate the graphical control element of the application to find out information about the application, to download the application, etc. The value to the developer of the application can be different depending upon the purpose for which the user selects or otherwise activates the graphical control element of the application. The expected value for the digital distribution provider can be a product of a value to the digital distribution provider in having a user select or otherwise activate a particular graphical control element of a particular application multiplied by a probability that the user will select or otherwise activate that graphical control element.

Using the prediction of the preference of the user for the application, the prediction of the expected value for the developer of the application, the prediction of the expected value for the digital distribution provider of the application, or any combination thereof, the digital distribution platform can change the appearance of the user interface to arrange the one or more graphic representations for the one or more applications to have a form that is likely to optimize the expected value to the developer, the expected value to the digital distribution provider, or both.

In the method 300, at an operation 302, the digital distribution platform can automatically receive at least some of the predictions. Such predictions can have been produced external of the digital distribution platform. Additionally or alternatively, at an operation 304, the digital distribution platform can automatically produce at least some of the predictions. In an embodiment, the digital distribution platform can include or can be operatively coupled to a recommendation engine configured to interact with a processor of the digital distribution platform to produce the prediction of the preference of the user for the application, the prediction of the expected value for the developer of the application, the prediction of the expected value for the digital distribution provider of the application, or any combination thereof.

In an embodiment, the information that the application has been updated can be used to produce one or more of the predictions. In an aspect, the digital distribution platform can be configured to receive the information that the application has been updated. For instance, a developer, using an upload platform and via a network, can upload the update to the application to a digital distribution platform. For example, the developer can be the developer 112, the upload platform can be the upload platform 104, the network can be the network 108, and the digital distribution platform can be the digital distribution platform 102 as illustrated in FIG. 1. Additionally or alternatively, the developer, using the upload platform and via the network, can upload information about the update to the first database. In an aspect, a processor of the digital distribution platform can be configured to retrieve, from the first database, information about updates to the application. The digital distribution platform can be configured to use this information to produce one or more of the predictions. For instance, the digital distribution platform can receive, at a fourth time, the information that the application has been updated. The digital distribution platform can automatically generate the user interface at a fifth time (at an operation 306). The fifth time can be different from the fourth time. For example, in order to optimize the expected value to the developer, the expected value to the digital distribution provider, or a both, the digital distribution platform can determine that the information about the update should be communicated to the user at a time that is different from the time at which the information that the application has been updated was received by the digital distribution platform. In an aspect, the time at which the digital distribution platform receives the information that the application has been updated (the fourth time) can be the time at which the digital distribution platform receives the update of the application (the first time). In another aspect, the fourth time can be different from the first time.

In an aspect, the information that the application has been updated can include an index of the application. For example, an application that includes digital media content (e.g., a movie, an e-book, etc.) can often include an index of the digital media content. Such an index can identify portions of the digital media content. Additionally or alternatively, the digital distribution platform can produce at least some of the index of the application. For example, a processor of the digital distribution platform can be configured to retrieve, from the first database, a first version of the application and a second version of the application. The processor can be configured to produce an index of the first version of the application and an index of a second version of the application. The processor can be configured to determine that the application has been updated from a comparison of the index of the first version of the application with the index of the second version of the application.

At the operation 306, the digital distribution platform can automatically generate, in response to the first time being later than the third time and in response to the second time being later than the first time, the user interface with the information about the update by changing the arrangement, on the user interface, of the graphical representations for the applications based on the one or more predictions.

Figure 4:
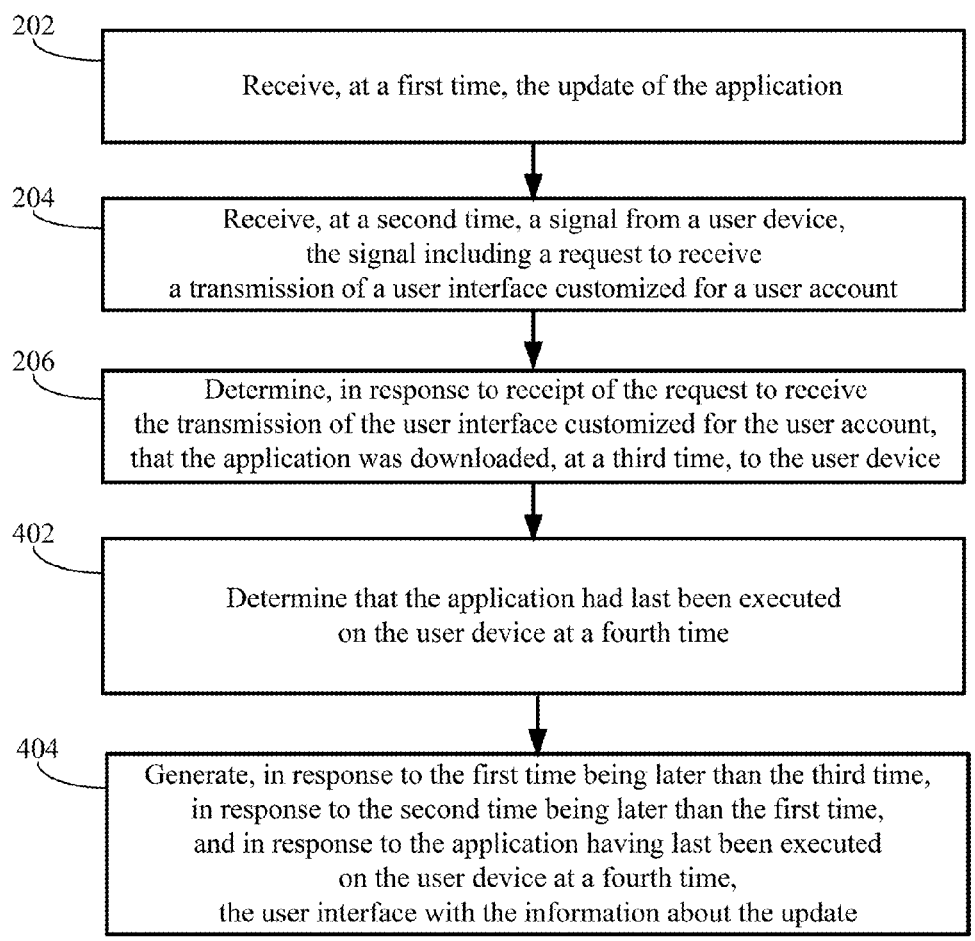
FIG. 4 is a flow diagram illustrating an example of a method for communicating information about an update of an application in response to determining that the application had last been executed on a user device a long time ago.

FIG. 4 is a flow diagram illustrating an example of a method 400 for communicating information about an update of an application in response to determining that the application had last been executed on a user device a long time ago. In the method 400, at the operation 202, the digital distribution platform can receive, at the first time, the update of the application. At the operation 204, the digital distribution platform can receive, at the second time, the signal from the user device. The signal can include the request to receive the transmission of the user interface customized for the user account. At the operation 206, the digital distribution platform can automatically determine, in response to receipt of the request to receive the transmission of the user interface customized for the user account, that the application was downloaded, at the third time, to the user device.

At an operation 402, the digital distribution platform can automatically determine that the application had last been executed on the user device at a fourth time. For example, the digital distribution platform can be configured to retrieve, from the user device via a network, information that indicates the last time that the application had been executed on the user device. The fourth time can be earlier than a difference of a predetermined duration of time subtracted from a present time. For example, if the fourth time is May 1, 2015, the predetermined duration of time is three months, and the present time is Sep. 30, 2015, then the application had last been executed on the user device more than three months earlier than the present time. For example, if the application is an electronic game, then it could be the situation that the user is no longer interested in playing this electronic game. However, it could also be the situation that the user is unaware that there has been an update to this electronic game and that if the user was aware of the update, then the user would be inclined to resume playing this electronic game. At an operation 404, the digital distribution platform can automatically generate, in response to the first time being later than the third time, in response to the second time being later than the first time, and in response to the application having last been executed on the user device at the fourth time, the user interface with the information about the update. In this manner, the information about the update can be communicated to the user in response to determining that the application had last been executed on the user device a long time ago. Having such information, the user may decide to download the update.

Figure 5:
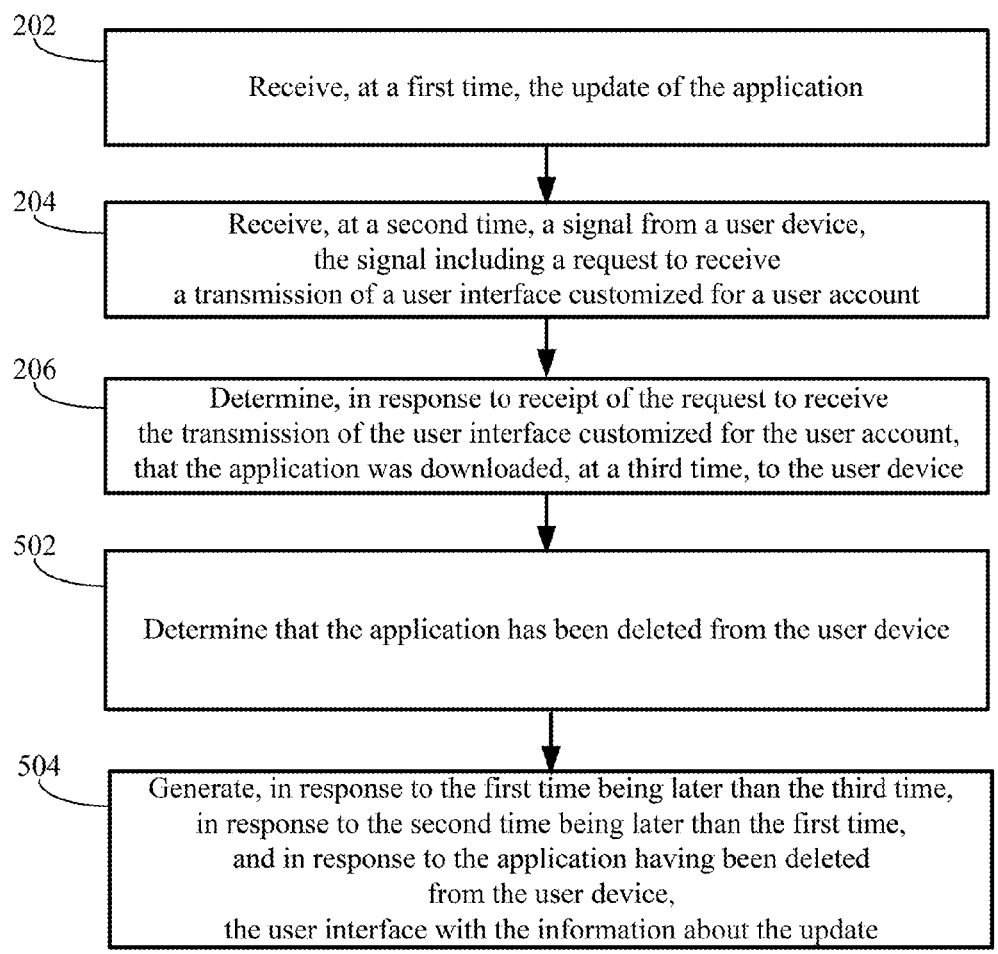
FIG. 5 is a flow diagram illustrating an example of a method for communicating information about an update of an application in response to determining that the application has been deleted from a user device.

FIG. 5 is a flow diagram illustrating an example of a method 500 for communicating information about an update of an application in response to determining that the application has been deleted from a user device. In the method 500, at the operation 202, the digital distribution platform can receive, at the first time, the update of the application. At the operation 204, the digital distribution platform can receive, at the second time, the signal from the user device. The signal can include the request to receive the transmission of the user interface customized for the user account. At the operation 206, the digital distribution platform can automatically determine, in response to receipt of the request to receive the transmission of the user interface customized for the user account, that the application was downloaded, at the third time, to the user device.

At an operation 502, the digital distribution platform can automatically determine that the application has been deleted from the user device. For example, the digital distribution platform can be configured to retrieve, from the user device via the network, information that indicates that the application has been deleted from the user device. At an operation 504, the digital distribution platform can automatically generate, in response to the first time being later than the third time, in response to the second time being later than the first time, and in response to the application having been deleted from the user device, the user interface with the information about the update. In this manner, the information about the update can be communicated to the user in response to determining that the application has been deleted from the user device. Having such information, the user may decide to re-download the application with the update.

Figure 6:
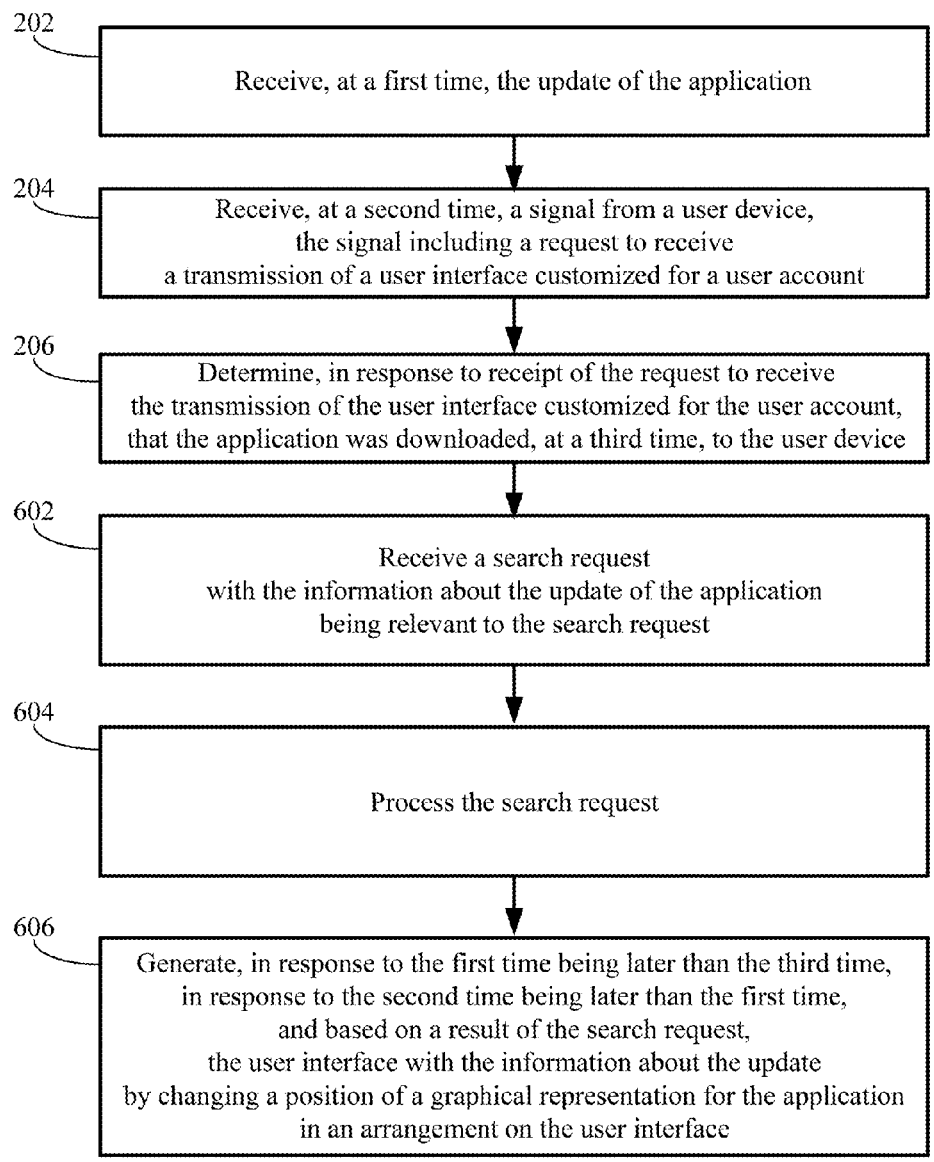
FIG. 6 is a flow diagram illustrating an example of a method for communicating information about an update of an application in response to a search request.

FIG. 6 is a flow diagram illustrating an example of a method 600 for communicating information about an update of an application in response to a search request. In the method 600, at the operation 202, the digital distribution platform can receive, at the first time, the update of the application. At the operation 204, the digital distribution platform can receive, at the second time, the signal from the user device. The signal can include the request to receive the transmission of the user interface customized for the user account. At the operation 206, the digital distribution platform can automatically determine, in response to receipt of the request to receive the transmission of the user interface customized for the user account, that the application was downloaded, at the third time, to the user device.

At an operation 602, the digital distribution platform can receive a search request. The information about the update of the application can be relevant to the search request. For example, the search request can be for a particular application, for a particular classification of applications, for a particular feature in an application, etc. At an operation 604, the digital distribution platform can automatically process the search request. At an operation 606, the digital distribution platform can automatically generate, in response to the first time being later than the third time, in response to the second time being later than the first time, and based on a result of the search request, the user interface with the information about the update. Generation of the user interface can include a change in a position of a graphical representation for the application in an arrangement, on the user interface, of one or more graphical representations for one or more applications.

As described above, the information about the update can be presented as a change in an appearance of the user interface. The appearance of the user interface can be customized for the user account. For example, the appearance of the user interface can include an arrangement of one or more graphical representations such that each graphical representation is associated with a corresponding application. Often, the user interface can include more graphical representations than can ergonomically be displayed on a screen of the user interface initially presented to the user. In such a case, graphical representations that are not displayed on the screen initially presented to the user can be displayed on one or more other screens. Additionally or alternatively, the screen can include a scroll feature so that the user can cause such graphical representations to be displayed on the screen.

For example, in the absence of the search request, the arrangement of the graphical representations can have a first form in which a first set of graphical representations is displayed on the screen initially presented to the user and a second set of graphical representations is not displayed on the screen initially presented to the user. In response to the search request, the arrangement of the graphical representations can have a second form such that graphical representations for applications included in the result of the search request can be included in the first set and displayed on the screen initially presented to the user. Additionally or alternatively, the graphical representations for applications included in the result of the search request can be placed at more prominent positions in the arrangement. Additionally, the change in the appearance of the user interface can include a change in an appearance of a graphical representation for the application (e.g., a change in appearance of an icon for the application, a star placed next to the icon, text placed next to the icon in which the text states "50% New Content!", "Free currency now included!", "Check out the free items inside!", "See the discounts on back to school items!", etc.) and/or an addition of text that includes at least some of the information about the update (e.g., addition of text in a display window of the user interface in which the text states "Application A now has new content!"). In this manner, the information about the update can be communicated to the user in response to the search request. Having such information, the user may decide to download the application with the update.

In various embodiments, the user interface with the information about the update can be generated using any combination of the operations of the methods 200, 300, 400, 500, and 600.

Figure 7:
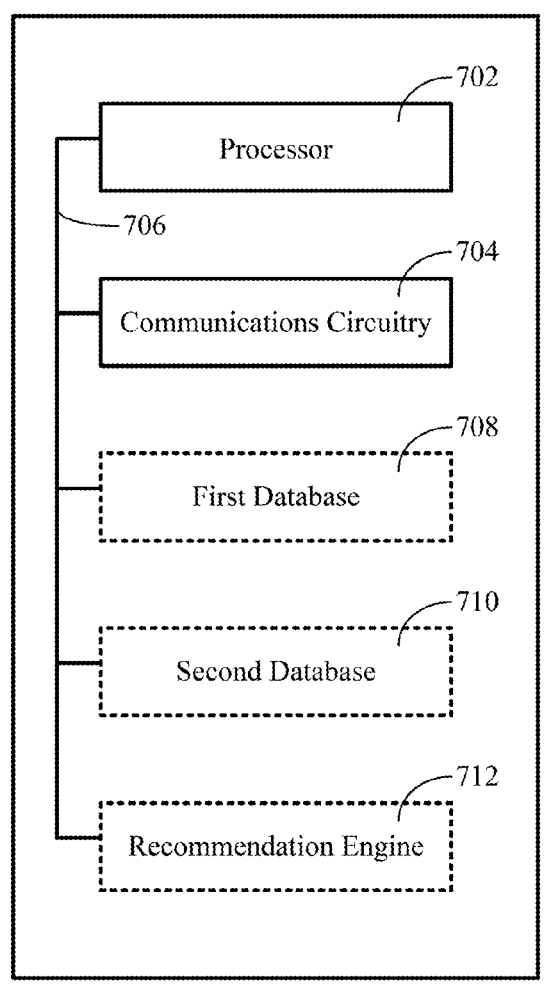
FIG. 7 is a block diagram illustrating an example of a system for communicating information about an update of an application according to an embodiment of the disclosed subject matter.

FIG. 7 is a block diagram illustrating an example of a system 700 for communicating information about an update of an application according to an embodiment of the disclosed subject matter. In an embodiment, the system 700 can be a digital distribution platform such as the digital distribution platform 102 illustrated in FIG. 1. The system 700 can include, for example, a processor 702, communications circuitry 704, and a bus 706. The processor 702 can include any processing circuit operative to control an operation of the system 700. The communications circuitry 704 can provide communications between the system 700 and devices external to the system 700. The communications circuitry 704 can be configured to provide communications via a packet switched network, a cellular network, a satellite network, an optical network, a telephone link, the like, or any combination thereof. The communications circuitry 704 can be configured to provide communications in a wired or a wireless manner. The communications circuitry 704 can be configured to perform simultaneously several communications operations using different networks. The bus 706 can be coupled to the processor 702 and the communications circuitry 704, and can be configured to facilitate communications among these components. Other devices and components (not illustrated) can be included in the system 700.

The communications circuitry 704 can be configured to receive the update of the application. In an embodiment, the system 700 can include a first database 708. The first database 708 can be configured to store the application, information about the application, etc. The first database 708 can be configured to record activities of a developer with respect to the application. Such activities can include, for example, dates and times at which the application is uploaded, dates and times at which updates to the application are uploaded, information about the updates, etc. In an aspect, the processor 702 can be configured to retrieve, from the first database 708, a time at which the system 700 received the update of the application.

The communications circuitry 704 can be configured to receive a signal from a user device. The signal can include a request to receive a transmission of a user interface customized for a user account. The user device and the user account can be associated with a user. The user account can be with a digital distribution provider. The digital distribution provider can be configured to provide, for each user account, a customized user interface. The customized user interface can be configured to present information in a manner preferred by the associated user. For example, the user device can be the user device 106, the user can be the user 114, and the digital distribution provider can be the digital distribution provider 110 as illustrated in FIG. 1. The processor 702 can be configured to determine a time at which the system 700 received, from the user device, the request to receive the transmission of the user interface customized for the user account.

The processor 702 can be configured to determine, in response to receipt of the request to receive the transmission of the user interface customized for the user account, a time at which the application was downloaded to the user device. In an embodiment, the system 700 can include a second database 710. The second database 710 can be configured to store information about a user account provided by the digital distribution provider such as an application marketplace, online store, or other distribution system. The second database 710 can be configured to record activities of the user with respect to the user account. Such activities can include, for example, dates and times at which the user logs into the user account, dates and times at which the user logs out of the user account, identifications of applications downloaded, dates and times at which applications are downloaded, dates and times at which graphical control elements are selected or otherwise activated on a user interface for the user account, etc. In an aspect, the processor 702 can be configured to retrieve, from the second database 710, the time at which the application was downloaded to the user device.

The processor 702 can be configured to generate, in response to the time at which the system received the update being later than the time at which the application was downloaded and in response to the time at which the system received the request being later than the time at which the system received the update, the user interface. The user interface can include the information about the update. For example, if the system 700 received the update of the application on Sep. 15, 2015, and received the request to receive the transmission of the user interface customized for the user account on Sep. 30, 2015, and the processor 702 determined that the application was downloaded to the user device on Jul. 1, 2015, the processor 702 can generate the user interface with the information about the update.

In an implementation, the information about the update can include a description of a change in content of the application included in the update. In an aspect, the change in content can be a new user feature of the application, a new game component in the application, a new promotion available, within the application, to a user, a change determined to be of interest to the user, the like, or any combination thereof. For example, the new user feature can be background information added to a digital media content application, new graphical control elements that allow the user to perform additional operations, new security features, etc. For instance, the new game component can include additional levels, new characters, changed items, etc. For illustration, the new promotion can include coupons, digital currency, virtual currency, award points, etc. For example, the change determined to be of interest to the user can be a particular change made to the application based upon information obtained from a profile of the user.

In an implementation, the information about the update can be presented as a change in an appearance of the user interface. The appearance of the user interface can be customized for the user account. For example, the appearance of the user interface can include an arrangement of one or more graphical representations such that each graphical representation is associated with a corresponding application. In an aspect, the change in the appearance can be a change in an appearance of a graphical representation for the application (e.g., a change in appearance of an icon for the application, a star placed next to the icon, text placed next to the icon in which the text states "50% New Content!", "Free currency now included!", "Check out the free items inside!", "See the discounts on back to school items!", etc.), an addition of text that includes at least some of the information about the update (e.g., addition of text in a display window of the user interface in which the text states "Application A now has new content!"), a change in a position of the graphical representation for the application in the arrangement (e.g., changing the position of the icon for the application to a more prominent position in the arrangement), the like, or any combination thereof.

In an aspect, an ordering of graphic representations in the arrangement can be based on an expected response of a user associated with the user account to the ordering. In an embodiment, the processor 702 can be configured to retrieve, from the second database 710, a user history with respect to one or more applications. The processor 702 can be configured to retrieve information about how the arrangement of the graphical representations for those one or more application were ordered on the user interface for the user account. Using this information, the processor 702 can be configured to determine if the user is more likely to respond to a graphical representation presented at a center of the user interface and less likely to respond to graphical representations presented progressively further away from the center of the user interface, or if the user is more likely to respond to a graphical representation presented near a top, left corner of the user interface and less likely to respond to graphical representations presented progressively further away from the top, left corner of the user interface, etc.

In an aspect, the change in the appearance can be based on a first prediction. The first prediction can be a prediction of a response of a user associated with the user account to the information about the update. In an embodiment, the processor 702 can be configured to retrieve, from the second database 710, a user history with respect to one or more applications. The processor 702 can be configured to determine, from the user history, activities performed by the user in response to information about one or more previous updates to the one or more applications. The activities performed by the user in response to the information about a previous update can include activities such as selecting or otherwise activating a graphical control element in response to the information about the previous update to find out information about the respective update and/or the corresponding application, to download the respective update and/or the corresponding application, to make a purchase, etc. Based on an analysis of the user history of the activities performed by the user in response to the information about the previous update, the processor 702 can produce the first prediction. Based on the first prediction, the change in the appearance of the user interface can include a change in the information about the update and/or a change in a classification of the user with respect to being targeted to receive the information about the update.

Additionally or alternatively, the change in the appearance can be based on a second prediction. The second prediction can be a prediction of a preference of the user for the application, a prediction of an expected value for a developer of the application, a prediction of an expected value for a digital distribution provider, associated with the digital distribution platform, of the application, the like, or any combination thereof.

In an embodiment, the processor 702 can be configured to retrieve, from the second database 710, a user history with respect to one or more other applications. The processor 702 can be configured to determine, from the user history, preferences of the user for one or more other applications. Based on the preferences of the user for the one or more other applications, the processor 702 can produce a prediction of the preference of the user for the application.

Additionally or alternatively, the developer and the digital distribution provider can have an agreement in which the digital distribution provider is compensated in response to the user selecting or otherwise activating a graphical control element of an application of the developer. The expected value for the developer can be a product of a value to the developer of an application in having a user select or otherwise activate a graphical control element of the application multiplied by a probability that the user will select or otherwise activate the graphical control element of the application. The user may select or otherwise activate the graphical control element of the application to find out information about the application, to download the application, etc. The value to the developer of the application can be different depending upon the purpose for which the user selects or otherwise activates the graphical control element of the application. The expected value for the digital distribution provider can be a product of a value to the digital distribution provider in having a user select or otherwise activate a particular graphical control element of a particular application multiplied by a probability that the user will select or otherwise activate that graphical control element.

Using the prediction of the preference of the user for the application, the prediction of the expected value for the developer of the application, the prediction of the expected value for the digital distribution provider of the application, or any combination thereof, the system 700 can change the appearance of the user interface to arrange the one or more graphic representations for the one or more applications to have a form that is likely to optimize the expected value to the developer, the expected value to the digital distribution provider, or both.

In an embodiment, the system 700, via the communications circuitry 704, can be configured to receive at least some of the predictions. Such predictions can have been produced external of the system 700. Additionally or alternatively, the processor 704 can be configured to produce at least some of the predictions. In an embodiment, the system 700 can include a recommendation engine 712 configured to interact with the processor 702 to produce the prediction of the preference of the user for the application, the prediction of the expected value for the developer of the application, the prediction of the expected value for the digital distribution provider of the application, or any combination thereof.

In an embodiment, the information that the application has been updated can be used to produce one or more of the predictions. In an aspect, the system 700, via the communications circuitry 704, can be configured to receive the information that the application has been updated. For instance, a developer, using an upload platform and via a network, can upload the update to the application to the system 700. For example, the developer can be the developer 112, the upload platform can be the upload platform 104, the network can be the network 108, and the digital distribution platform can be the digital distribution platform 102 as illustrated in FIG. 1. Additionally or alternatively, the developer, using the upload platform and via the network, can upload information about the update to the first database 708. In an aspect, the processor 702 can be configured to retrieve, from the first database 708, information about updates to the application. The processor 702 can be configured to use this information to produce one or more of the predictions. For instance, the system 700, via the communications circuitry 704, can be configured to receive, at a first time, the information that the application has been updated. The processor 702 can be configured to generate the user interface at a second time. The second time can be different from the first time. For example, in order to optimize the expected value to the developer, the expected value to the digital distribution provider, or a both, the processor 702 can determine that the information about the update should be communicated to the user at a time that is different from the time at which the information that the application has been updated was received by the system 700. In an aspect, the time at which the system 700 receives the information that the application has been updated can be the time at which the communications circuitry 704 receives the update of the application. In another aspect the time at which the system 700 receives the information that the application has been updated can be different from the time at which the communications circuitry 704 receives the update of the application.

In an aspect, the information that the application has been updated can include an index of the application. For example, an application that includes digital media content (e.g., a movie, an e-book, etc.) can often include an index of the digital media content. Such an index can identify portions of the digital media content. Additionally or alternatively, the system 700 can produce at least some of the index of the application. For example, the processor 702 can be configured to retrieve, from the first database 708, a first version of the application and a second version of the application. The processor 702 can be configured to produce an index of the first version of the application and an index of a second version of the application. The processor 702 can be configured to determine that the application has been updated from a comparison of the index of the first version of the application with the index of the second version of the application.

In an embodiment, the processor 702 can be configured to generate, in response to the time at which the system received the update being later than the time at which the application was downloaded to the user device and in response to the time at which the system received the request being later than the time at which the system received the update, the user interface with the information about the update by changing the arrangement, on the user interface, of the graphical representations for the applications based on the one or more predictions.

In an embodiment, the processor 702 can be configured to determine that the application had last been executed on the user device at a particular time. For example, the processor 702 can be configured to retrieve, from the user device via a network, information that indicates the last time that the application had been executed on the user device. The particular time can be earlier than a difference of a predetermined duration of time subtracted from a present time. For example, if the particular time is May 1, 2015, the predetermined duration of time is three months, and the present time is Sep. 30, 2015, then the application had last been executed on the user device more than three months earlier than the present time. For example, if the application is an electronic game, then it could be the situation that the user is no longer interested in playing this electronic game. However, it could also be the situation that the user is unaware that there has been an update to this electronic game and that if the user was aware of the update, then the user would be inclined to resume playing this electronic game. In this embodiment, the processor 702 can be configured to generate, in response to the time at which the system received the update being later than the time at which the application was downloaded to the user device, in response to the time at which the system received the request being later than the time at which the system received the update, and in response to the application having last been executed on the user device at the particular time, the user interface with the information about the update. In this manner, the information about the update can be communicated to the user in response to determining that the application had last been executed on the user device a long time ago. Having such information, the user may decide to download the update.

In an embodiment, the processor 702 can be configured to determine that the application has been deleted from the user device. For example, the processor 702 can be configured to retrieve, from the user device via the network, information that indicates that the application has been deleted from the user device. In this embodiment, the processor 702 can be configured to generate, in response to the time at which the system received the update being later than the time at which the application was downloaded to the user device, in response to the time at which the system received the request being later than the time at which the system received the update, and in response to the application having been deleted from the user device, the information about the update to the user. Having such information, the user may decide to re-download the application with the update.

In an embodiment, the system 700, via the communications circuitry 704, can be configured to receive a search request. The information about the update of the application can be relevant to the search request. For example, the search request can be for a particular application, for a particular classification of applications, for a particular feature in an application, etc. In this embodiment, the processor 702 can be configured to process the search request and to generate, in response to the time at which the system received the update being later than the time at which the application was downloaded to the user device, in response to the time at which the system received the request being later than the time at which the system received the update, and based on a result of the search request, the user interface with the information about the update. Generation of the user interface can include a change in a position of a graphical representation for the application in an arrangement, on the user interface, of one or more graphical representations for one or more applications.

As described above, the information about the update can be presented as a change in an appearance of the user interface. The appearance of the user interface can be customized for the user account. For example, the appearance of the user interface can include an arrangement of one or more graphical representations such that each graphical representation is associated with a corresponding application. Often, the user interface can include more graphical representations than can ergonomically be displayed on a screen of the user interface initially presented to the user. In such a case, graphical representations that are not displayed on the screen initially presented to the user can be displayed on one or more other screens. Additionally or alternatively, the screen can include a scroll feature so that the user can cause such graphical representations to be displayed on the screen.

For example, in the absence of the search request, the arrangement of the graphical representations can have a first form in which a first set of graphical representations is displayed on the screen initially presented to the user and a second set of graphical representations is not displayed on the screen initially presented to the user. In response to the search request, the arrangement of the graphical representations can have a second form such that graphical representations for applications included in the result of the search request can be included in the first set and displayed on the screen initially presented to the user. Additionally or alternatively, the graphical representations for applications included in the result of the search request can be placed at more prominent positions in the arrangement. Additionally, the change in the appearance of the user interface can include a change in an appearance of a graphical representation for the application (e.g., a change in appearance of an icon for the application, a star placed next to the icon, text placed next to the icon in which the text states "50% New Content!", "Free currency now included!", "Check out the free items inside!", "See the discounts on back to school items!", etc.) and/or an addition of text that includes at least some of the information about the update (e.g., addition of text in a display window of the user interface in which the text states "Application A now has new content!"). In this manner, the information about the update can be communicated to the user in response to the search request. Having such information, the user may decide to download the application with the update.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 8:
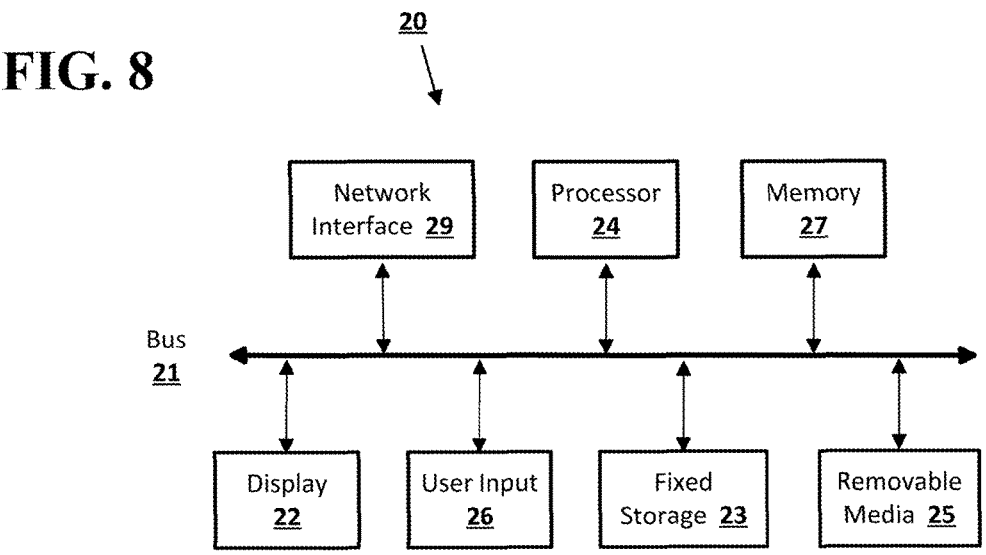
FIG. 8 illustrates an example computing device suitable for implementing embodiments of the presently disclosed subject matter.

Embodiments of the presently disclosed subject matter may be implemented in and used with a variety of component and network architectures. FIG. 8 illustrates an example computing device 20 suitable for implementing embodiments of the presently disclosed subject matter. The device 20 can be, for example, a desktop or laptop computer, or a mobile computing device such as a smart phone, tablet, or the like. The device 20 can include a bus 21 (which can interconnect major components of the computer 20, such as a central processor 24), a memory 27 (such as random-access memory (RAM), read-only memory (ROM), flash RAM, or the like), a user display 22 (such as a display screen), a user input interface 26 (which can include one or more controllers and associated user input devices such as a keyboard, mouse, touch screen, and the like), a fixed storage 23 (such as a hard drive, flash storage, and the like), a removable media component 25 (operative to control and receive an optical disk, flash drive, and the like), and a network interface 29 operable to communicate with one or more remote devices via a suitable network connection.

The bus 21 can allow data communication between the central processor 24 and one or more memory components, which can include RAM, ROM, and other memory, as previously noted. Typically RAM can be the main memory into which an operating system and application programs are loaded. A ROM or flash memory component can contain, among other code, the basic input-output system (BIOS) which can control basic hardware operation such as the interaction with peripheral components. Applications resident with the computer 20 can generally be stored on and accessed via a computer readable medium, such as a hard disk drive (e.g., fixed storage 23), an optical drive, floppy disk, or other storage medium.

The fixed storage 23 can be integral with the computer 20 or can be separate and accessed through other interfaces. The network interface 29 can provide a direct connection to a remote server via a wired or wireless connection. The network interface 29 can provide such connection using any suitable technique and protocol as is readily understood by one of skill in the art, including digital cellular telephone, WiFi™, Bluetooth®, near-field, and the like. For example, the network interface 29 can allow the computer to communicate with other computers via one or more local, wide-area, or other communication networks, as described in further detail below.

Many other devices or components (not shown) can be connected in a similar manner (e.g., document scanners, digital cameras and so on). Conversely, all of the components illustrated in FIG. 8 need not be present to practice the present disclosure. The components can be interconnected in different ways from that illustrated. The operation of a computer such as that illustrated in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
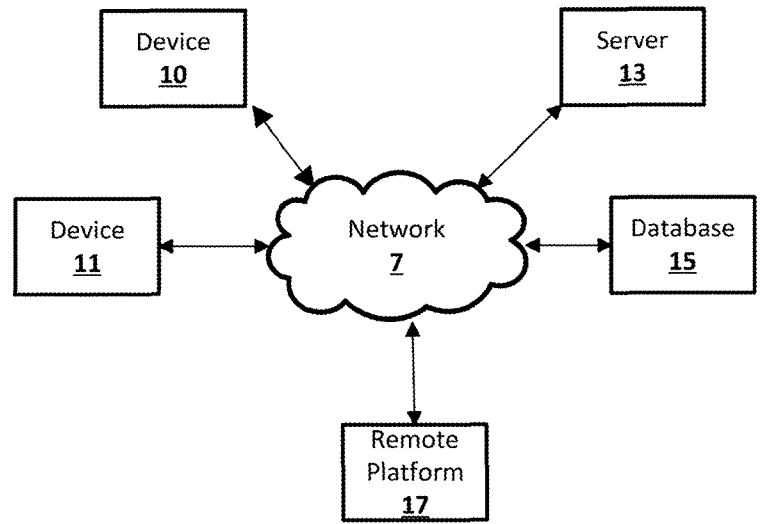
FIG. 9 illustrates an example network arrangement according to an embodiment of the disclosed subject matter.

FIG. 9 illustrates an example network arrangement according to an embodiment of the disclosed subject matter. One or more devices 10, 11, such as local computers, smart phones, tablet computing devices, and the like can connect to other devices via one or more networks 7. Each device can be a computing device as previously described. The network can be a local network, wide-area network, the Internet, or any other suitable communication network or networks, and can be implemented on any suitable platform including wired and/or wireless networks. The devices can communicate with one or more remote devices, such as servers 13 and/or databases 15. The remote devices can be directly accessible by the devices 10, 11, or one or more other devices can provide intermediary access such as where a server 13 provides access to resources stored in a database 15. The devices 10, 11 also can access remote platforms 17 or services provided by remote platforms 17 such as cloud computing arrangements and services. The remote platform 17 can include one or more servers 13 and/or databases 15.

More generally, various embodiments of the presently disclosed subject matter can include or be embodied in the form of computer-implemented processes and apparatuses for practicing those processes. Embodiments also can be embodied in the form of a computer program product having computer program code containing instructions embodied in non-transitory and/or tangible media, such as floppy diskettes, CD-ROMs, hard drives, universal serial bus (USB) drives, or any other machine readable storage medium, such that when the computer program code is loaded into and executed by a computer, the computer becomes an apparatus for practicing embodiments of the disclosed subject matter. Embodiments also can be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Embodiments can be implemented using hardware that can include a processor, such as a general purpose microprocessor and/or an application-specific integrated circuit (ASIC) that embodies all or part of the techniques according to embodiments of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for communicating an information about an update of an application, comprising:
   receiving, by a digital distribution platform at a first time, the update of the application;
   receiving, by the digital distribution platform at a second time, a signal from a user device, the signal including a request to receive a transmission of a user interface customized for a user account;
   automatically determining, by the digital distribution platform in response to receipt of the request to receive the transmission of the user interface customized for the user account, that the application was downloaded, at a third time, to the user device; and
   automatically generating, by the digital platform in response to the first time being later than the third time, in response to the second time being later than the first time, and rather than independently communicating a notice that the application has been updated, the user interface, wherein the user interface includes the information about the update.

2. The computer-implemented method of claim 1, wherein the information about the update comprises a description of a change in content of the application included in the update.

3. The computer-implemented method of claim 2, wherein the change in content comprises at least one change selected from the group consisting of: a new user feature of the application, a new game component in the application, a new promotion available, within the application, to a user, and a change determined to be of interest to the user.

4. The computer-implemented method of claim 1, wherein the information about the update is presented as a change in an appearance of the user interface, the change in the appearance comprising at least one change selected from the group consisting of: a change in an appearance of a graphical representation for the application, an addition of text that includes at least some of the information about the update, and a change in a position of the graphical representation in an arrangement of a plurality of graphical representations for a plurality of applications.

5. The computer-implemented method of claim 4, wherein an ordering of graphic representations in the arrangement is based on an expected response of a user associated with the user account to the ordering.

6. The computer-implemented method of claim 4, wherein the change in the appearance is based on a first prediction, the first prediction being a prediction of a response of a user associated with the user account to the first information about the update.

7. The computer-implemented method of claim 6, wherein the change in the appearance is further based on a second prediction, wherein the second prediction comprises at least one prediction selected from the group consisting of: a prediction of a preference of the user for the application, a prediction of an expected value for a developer of the application, and a prediction of an expected value for a digital distribution provider, associated with the digital distribution platform, of the application.

8. The computer-implemented method of claim 7, further comprising receiving, by the digital distribution platform, at least one of the first prediction or the second prediction.

9. The computer-implemented method of claim 7, further comprising producing, by the digital distribution platform, at least one of the first prediction or the second prediction.

10. The computer-implemented method of claim 9, wherein the producing the second prediction is based on an information that the application has been updated.

11. The computer-implemented method of claim 10, further comprising receiving, by the digital distribution platform, the information that the application has been updated.

12. The computer-implemented method of claim 11, wherein the receiving the information that the application has been updated is at a fourth time, the automatically generating the user interface is at a fifth time, and the fifth time is different from the fourth time.

13. The computer-implemented method of claim 12, wherein the fourth time is the first time.

14. The computer-implemented method of claim 10, wherein the information that the application has been updated includes an index of the application.

15. The computer-implemented method of claim 14, further comprising automatically producing, by the digital distribution platform, the index of the application.

16. The computer-implemented method of claim 1, further comprising automatically determining, by the digital distribution platform, that the application had last been executed on the user device at a fourth time, the fourth time being earlier than a difference of a predetermined duration of time subtracted from a present time, wherein the automatically generating the user interface is in response to the application having last been executed on the user device at the fourth time.

17. The computer-implemented method of claim 1, further comprising automatically determining, by the digital distribution platform, that the application has been deleted from the user device, wherein the automatically generating the user interface is in response to the application having been deleted from the user device.

18. The computer-implemented method of claim 1, further comprising:
receiving, by the digital distribution platform, a search request, wherein the information about the update of the application is relevant to the search request; and
automatically processing, by the digital distribution platform, the search request, wherein the automatically generating the user interface is based on a result of the search request and includes a change in a position of a graphical representation for the application in an arrangement, on the user interface, of a plurality of graphical representations for a plurality of applications.

19. A non-transitory computer-readable medium storing computer code for controlling a processor to cause the processor to communicate information about an update of an application, the computer code including instructions to cause the processor to:
receive, at a first time, the update of the application;
receive, at a second time, a signal from a user device, the signal including a request to receive a transmission of a user interface customized for a user account;
determine, in response to receipt of the request to receive the transmission of the user interface customized for the user account, that the application was downloaded, at a third time, to the user device; and
generate, in response to the first time being later than the third time, in response to the second time being later than the first time, and rather than independently communicate a notice that the application has been updated, the user interface, wherein the user interface includes the information about the update.

20. A system for communicating information about an update of an application, comprising:
communications circuitry configured to:
receive the update of the application, and
receive a signal from a user device, the signal including a request to receive a transmission of a user interface customized for a user account; and
a processor configured to:
determine a time at which the system received the update,
determine a time at which the system received the request,
determine, in response to receipt of the request to receive the transmission of the user interface customized for the user account, a time at which the application was downloaded to the user device, and
generate, in response to the time at which the system received the update being later than the time at which the application was downloaded to the user device, in response to the time at which the system received the request being later than the time at which the system received the update, and rather than independently communicate a notice that the application has been updated, the user interface, wherein the user interface includes the information about the update.

21. The system of claim 20, further comprising:
a first database configured to store information about the application; and
a second database configured to store information about the user account, wherein the processor is configured to retrieve, from the first database, the time at which the system received the update, and to retrieve, from the second database, the time at which the application was downloaded to the user device.

22. The system of claim 20, wherein the information about the update is presented as a change in a position of a graphical representation for the application in an arrangement of a plurality of graphical representations for a plurality of applications, and further comprising a recommendation engine configured to interact with the processor to produce a prediction, the prediction comprising at least one prediction selected from the group consisting of: a prediction of a response of a user associated with the user account to the information about the update, a prediction of a preference of the user for the application, a prediction of an expected value for a developer of the application, and a prediction of an expected value for a digital distribution provider, associated with the digital distribution platform, of the application.

* * * * *